Figure 3:
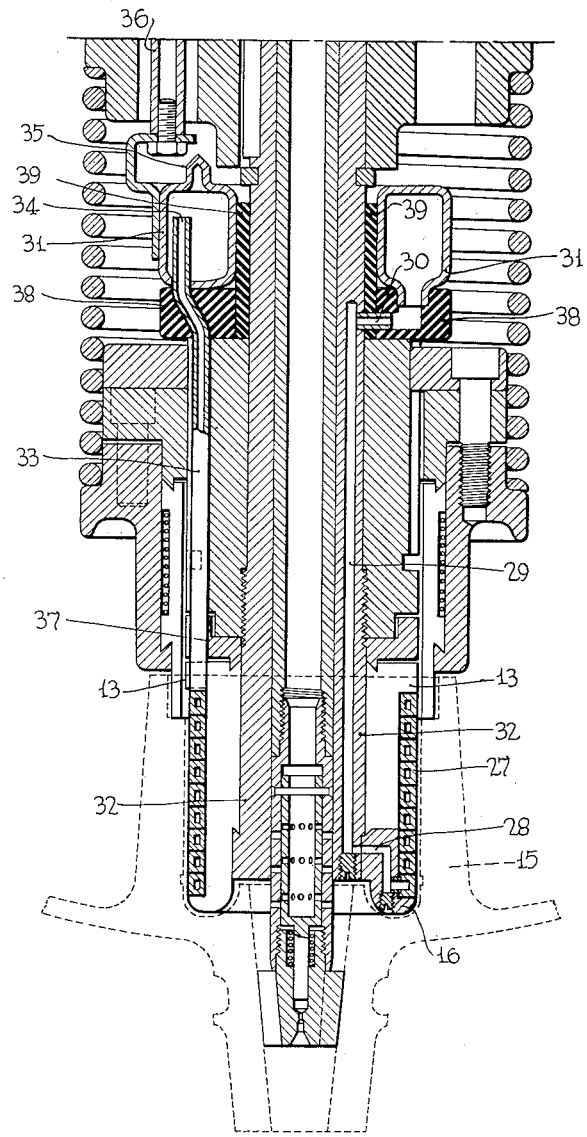

April 28, 1942.     H. E. SOMES     2,281,335
INDUCTION HEATING
Filed May 21, 1940     2 Sheets-Sheet 1
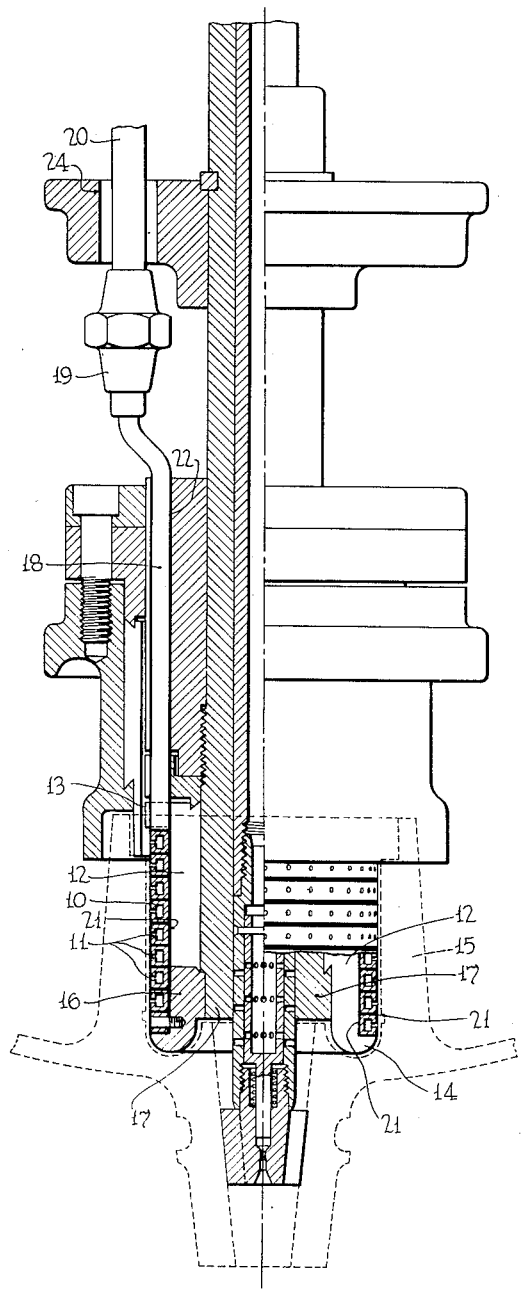
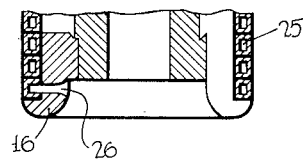
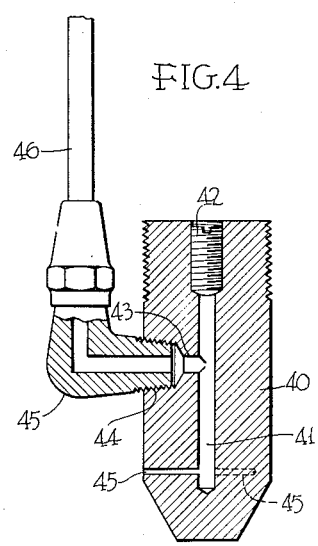
*INVENTOR*
Howard E. Somes
BY John P. Tarbox
*ATTORNEY*

Patented Apr. 28, 1942

2,281,335

UNITED STATES PATENT OFFICE 2,281,335

INDUCTION HEATING

Howard E. Somes, Detroit, Mich., assignor to Budd Induction Heating, Inc., Philadelphia, Pa., a corporation of Michigan Application May 21, 1940, Serial No. 336,363

4 Claims. (Cl. 219—13)

The present invention relates in general to electrical heating and in particular to differential internal heat treatment of objects by electromagnetic induction utilizing an inducing element in inductive relation with the portion of the object to be treated during the generation of heat in the object.

In such heat treatment by electromagnetic induction and especially where localization of the heat treatment to a relatively extremely shallow depth is desired as in surface hardening and especially where the space available for the inducing element is small as in the heat treatment of an inner surface portion of a hollow object, there is a tendency for the inducing element to over heat, especially where a high rate of energy input is necessary.

An object of the present invention is, therefore, to provide for the absorption of heat from the coil with rapidity and to an extent sufficient to prevent undue heating of the coil during a heat-treating period.

Another object is to cool the heating coil in an electromagnetic induction heating system in such manner that the coil temperature does not fall below the temperature of the surrounding atmosphere, whereby there is no danger of moisture being condensed from the atmosphere onto the coil and, therefore, no danger of any such condensed moisture effecting a short-circuit or loss of current from any part or parts of the inducing coil.

One object is obtained by the provision of an inducing coil formed from a tubular conductor arranged to lie within the work-piece with the outer walls of the tubular conductor in close proximity to the work-piece and arranged to be supplied with a liquified gas refrigerant such as liquid carbon dioxide, and to permit vapors formed by absorption of heat from the walls of the tube to be discharged through small openings in the walls of the tube either directly to atmosphere when the inducing coil is out of the work-piece or, when in the work-piece, into the space between the heating coil and the inner surface of the work-piece. With this arrangement heat is absorbed from the tube substantially uniformly throughout its length and preferably mostly from the outer walls of the tubular conductor which is that portion nearest the work-piece to be heated and consequently the portion which receives the most radial heat from the work-piece during heat treatment.

Another method of attaining an object of my invention is the provision of an arrangement whereby a liquid refrigerant such as carbon dioxide may be charged into the tubular inducing coil and permitted to evaporate or boil therein to absorb heat therefrom during operation of the coil, without contact of the refrigerant with the work-piece, the refrigerant vapors being exhausted to atmosphere or condensed and reused.

Various other objects and advantages of the invention will be apparent from a perusal of the following specification and the drawings accompanying the same.

Figure 1 is a view partly in axial section showing an induction heating unit having a perforated inducing coil constructed according to my invention and situated in operative relation with a work-piece to be heat treated, Figure 2 is a fragmentary view of a modified form of the device of Figure 1 in which the liquid refrigerant is vaporized in an imperforate tubular conductor, Figure 3 is a view partly in axial section of a further modification, in which the refrigerant is held in a closed system and condensed for reuse, and Figure 4 is a further modification applying the invention to a spot-welding electrode.

Referring to the drawings in detail and first to Figure 1, this shows an induction heating unit for effecting localized internal heat treatment of hollow objects and of the general type of that disclosed in my copending applications, Serial No. 50,829, filed November 21, 1935, for Inside induction heater and Serial No. 96,346, filed August 17, 1936, for Induction heat-treating apparatus, and to which the present invention is applied by forming the inducing coil 10 from a hollow conductors having perforations 11 in the outer wall. The coil is positioned about a hollow, cylindrical, laminated core element 12 built up of radially tapered laminations extending radially outwardly across the ends of the coil to form pole pieces 13 and 14 extending radially outwardly into close proximity to the inner surface of the hollow work-piece 15, in the present instance an automobile wheel hub. The lower terminal of the coil is secured in electrical contact with a metallic terminal plug or insert 16 mounted in electrical contact with the inside mounting tube 17, while the upper end of the coil 10 is connected through a vertical tube 18 and a suitable union 19 with a supply conduit 20 leading to a suitable source of liquified refrigerant, such as carbon dioxide, nitrogen or carbon tetra-chloride. The convolutions of the coil 10 are suitably insulated from each other and from the laminated core 12 as by the intervening insulating material 21. The vertical tubular element 18 and supply conduit 20 form one of the electrical leads for the coil, and are insulated from the framework of the device by a layer of insulating material 22 and the air space in the opening 24 in the frame through which the extension and conduit pass. The other electrical lead to the lower terminal of the coil is formed by the metal frame-work of the device including the inside mounting tube 17 and the terminal plug 16.

In operation when it is desired to cool the inducing coil down to a very low temperature to greatly increase its electrical conductivity and render it capable of absorbing a relatively large amount of heat without reaching an unduly high temperature, a suitable charge of liquid refrigerant is passed into the convolutions of the coil through the conduit 20 and extension 18 which rapidly evaporates partly within the coil and partly as it passes out through the perforations 11 where it expands into the surrounding atmosphere, thus absorbing heat from the coil and reducing its temperature to a point well below freezing substantially throughout the length of the coil, the greater amount of heat absorption and consequently the greater amount of cooling, taking place at the outer wall of the coil. The coil thus chilled is placed within the work-piece in the position shown in the drawings and energized by alternating current of suitable frequency to effect a localized heating of the interior wall of the work-piece by current induced in the latter. The rate of energy input may be in the neighborhood of 15 kilowatts per square inch of the surface of the portion of the work-piece to be treated. This operation effects a rise in temperature of the exterior wall of the tubular coil due partly to the concentration of current flow in such portion and partly to the proximity of such portion to the heated surface of the work, which latter produces a rise in temperature of the coil by radiation from the work. However, due to the extreme preliminary cooling, to a point well below freezing, the short duration of the energization of the coil and the short duration of the presence of the coil in the work-piece, an undue rise in temperature is avoided. The step of precooling may take place after placement of the coil in inductive relation with the work-piece and before energization of the coil without undue cooling of the work-piece by supplying the refrigerant at a rate insufficient to reach the space between the coil and the work-piece in the liquid phase.

An important advantage of this extreme precooling of the inducing coil is that the resultant lowered resistance permits an extremely large volume of current to be passed through the coil without undue rise in temperature for a period of time which though short, is a substantial portion, and may be in some instances the major portion, of the total operating period where such period is of brief duration as in the heat-treatment of a hub simultaneously throughout the portion to be treated.

Where it is desired to reduce the temperature of both the coil and the work-piece, the coil may be placed within the work-piece in the position shown in Fig. 1, and the charge of refrigerant then supplied to the coil as before, in which case the expansion of the refrigerant at the openings in the coil and within the space between the coil and the work-piece, bring about a rapid absorption of heat from both the coil and the opposed adjacent internal surface of the work-piece.

Where it is desired to cool the coil during operation or a portion of the operation on the work-piece, the supply of liquid refrigerant may be supplied at a rate at least sufficient to permit a change from the liquid to a gaseous state before leaving the perforations in the coil, so that the greater absorption of heat will take place substantially within the coil and the coil will be maintained at a minimum temperature without undue absorption of heat from the work-piece.

It is to be noted here that this use of a liquid refrigerant volatilized throughout the coil from end to end makes possible a substantially uniform cooling of the coil without producing undue condensation of moisture on the lead-in pipe.

Further, where it is desired to retard heating of the extreme inner surface portion of the work-piece for at least a portion of the period of energization of the coil, the supply of refrigerant may be continued at a rate sufficient to carry the refrigerant on through the perforations in the liquid phase so that the change from a liquid to a gas will take place in substantial part in the space between the coil and the surface to be treated.

This use of a continuous supply of refrigerant through and over the outer surface of the coil and the surface to be treated during energization of the coil is made possible by the fact that the refrigerant is a substantially inert and electrically insulating fluid both in the liquid and gaseous phase, and has the advantage of maintaining an inert atmosphere between the inducing coil and the surface under treatment.

In the modified form shown in Figure 2, the construction is the same as that of Figure 1 except that the inducing coil is formed from an imperforate tubular conductor 25 which at its lower end is arranged to communicate with the atmosphere beyond the coil structure through an expansion nozzle 26 formed in the terminal plug 16.

In the operation of the modification shown in Figure 2 the coil is cooled by the supply of liquid refrigerant thereto, as before described in connection with Figure 1, the liquid refrigerant passing through the coil and to atmosphere by way of the expansion nozzle 26, evaporating on its way with the result that heat is rapidly absorbed from the coil to lower its temperature and render it highly conductive and at the same time capable of absorbing a considerable amount of heat without undue rise in temperature.

It is also contemplated to operate the arrangement shown in Figure 2, by closing the bottom outlet 26 and filling the tubular conductor with a volatile liquid refrigerant to be evaporated within the tube and the vapors allowed to escape through the top of the tube during operation of the coil.

In the modification shown in Figure 3, the inducing coil is formed of a solid-wall tube 27 connected at its lower end through conduit passages 28, 29 and 30 in the frame-work of the heating element to the bottom of an annular condenser chamber 31, mounted about the inner mounting tube 32 and connected at its upper end through a vertical tubular extension 33 extending up through the frame-work of the heating element into communication with the upper interior portion of the condenser chamber 31 at 34. The condenser chamber 31 is provided with a suitable filling tube 35 which is sealed off after the system is supplied with a suitable volatile refrigerant in liquid form sufficient to substantially fill the coil, the sealing off being effected under known conditions to maintain the refrigerant in the coil in the liquid phase at room temperature. It will be understood, of course, that the condenser chamber 31 and the various joints connecting the coil therewith will be made of sufficient strength to withstand the pressures involved.

Electrical connection with the lower terminal of the coil 27 is effected through the metallic terminal plug 16 and the central mounting tube 32 the same as in Figure 1, while electrical connection with the upper insulated terminal of the coil is effected through the tubular extension 33, condenser chamber 31 and conductor 36. To maintain insulation of the upper terminal of the coil from the mounting tube 27 and other frame portions to which the lower coil terminal is electrically connected, the extension 33 is insulated from the frame-work by a strip of insulating material 37 and by the provision of insulating elements 38 and 39 between the condenser chamber and the frame-work.

In the use of this form of the device, the refrigerant remains liquid in the coil at room temperature, but upon absorption of additional heat by the coil during the operation, the liquid is caused to evaporate within the coil, forcing its vapor up through the vertical extension 33 into the condensing chamber where it condenses and returns to the coil by way of the conduits 30 and 29, maintaining a circulation of liquid and vapor through the coil to absorb heat therefrom and transfer the same to the atmosphere through the walls of the condenser chamber 31 by convection and radiation. The cooling system thus functions as a means of heat interchange between the coil and atmosphere, tending to maintain the coil substantially at or slightly above the temperature of the surrounding atmosphere, whereby condensation of moisture from the atmosphere onto the coil is prevented. To increase the rate of heat interchange between the coil and the atmosphere the walls of the condenser chamber may be provided with radiating fins. It is also contemplated to use forced circulation between the coil and the condensing or radiating chamber, and to use any well-known means of removing heat from the cooling fluid so long as such is not cooled below atmospheric temperature.

In the modification shown in Figure 4, the invention is applied to the cooling of a spot-welding electrode. Here the electrode 40 is provided with a central bored-out chamber 41 closed at the top by a closure plug 42 and provided near the bottom or tip with a plurality of outlet passages 45 extending radially outwardly from the chamber 41 through and to the outside of the electrode. An inlet channel 43 extends through the side of the electrode into communication with the central chamber 41 and is taper threaded at 44 to receive a tubular coupling element 45 coupled to a supply tube 46 leading from a suitable source of liquid refrigerant not shown.

In operation, a suitable volatile liquid refrigerant, for example liquid carbon dioxide, is fed through the supply tube into the central chamber 41 where it expands into vapor absorbing heat from the body of the electrode 40 and exhausting out to atmosphere through the multiple radial passages 45.

While I have herein shown and described certain specific embodiments of my invention for the sake of disclosure, it is to be understood that the invention is not limited to such specific embodiments but contemplates all such modifications and variants thereof as fall within the scope of the appended claims.

The supercooling of the inducing coil is claimed in my copending application, Serial No. 336,128, filed May 20, 1940.

What I claim is:

1. In a device for heat-treating a work-piece by electromagnetic induction, an inducing coil formed from a tubular conductor, a heat interchange element situated away from the coil and in heat interchange relation with the atmosphere surrounding the coil, and connections for a circulation of cooling fluid between the coil and said heat interchange element, a cooling fluid in said connections and coil, the cooling fluid being supplied to said coil at a temperature no lower than atmospheric temperature, whereby the danger of any moisture being condensed on the coil is substantially eliminated.

2. In a device for heat treating a workpiece by electromagnetic induction, an inducing coil adapted for placement in close proximity with the workpiece, having a cooling conduit therethrough, a coolant in said conduit, and a heat exchange element for the coolant, said heat exchange element being exposed to substantially the same atmospheric temperature as said coil and being adapted to maintain the coolant supplied to said coil at a temperature at least that of atmospheric temperature, whereby moisture condensate from the surrounding atmosphere cannot form on said coil.

3. The method of cooling a hollow inducing conductor of an electromagnetic induction heating apparatus which comprises circulating a cooling fluid through said conductor, removing heat from said cooling fluid at such a rate that the fluid entering the work-heating portion of the conductor is no lower than the temperature of the atmosphere, whereby said conductor is maintained at a temperature which is at or above that of the surrounding atmosphere to eliminate the deposition of moisture on said conductor.

4. In a device for heating a work piece by electromagnetic induction, a hollow inducing conductor, means for supplying cooling fluid to said conductor, the improvement for eliminating the deposition of atmospheric moisture on said conductor, which improvement includes a heat exchange device for removing heat from the cooling fluid, said device being spaced from the portion of the conductor which is effective to heat the work and constructed to remove no more than enough heat from the cooling fluid to keep such fluid substantially at or slightly above the temperature of the atmosphere adjacent said conductor.

HOWARD E. SOMES.